W. C. BUCK.
COMBINATION NUT LOCK AND WASHER.
APPLICATION FILED FEB. 17, 1914. RENEWED APR. 28, 1915.
1,142,018.
Patented June 8, 1915.
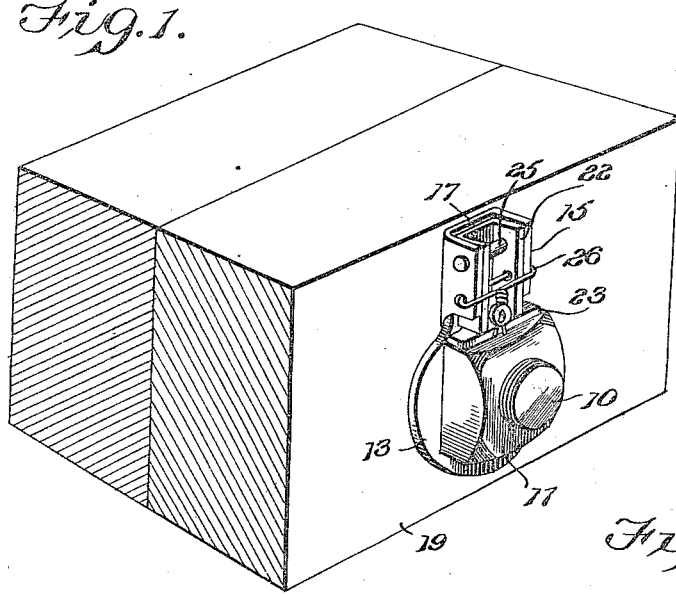
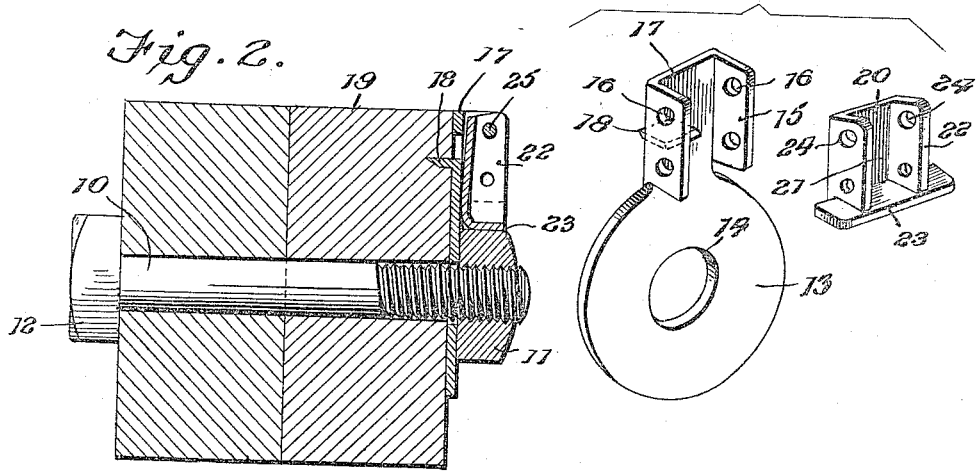
Inventor
W. C. Buck.
Witnesses
By
, Attorneys.

UNITED STATES PATENT OFFICE.

WILLIAM C. BUCK, OF LETHBRIDGE, ALBERTA, CANADA.

COMBINATION NUT-LOCK AND WASHER.

1,142,018.  Specification of Letters Patent.  Patented June 8, 1915.

Application filed February 17, 1914, Serial No. 819,274. Renewed April 28, 1915. Serial No. 24,574.

*To all whom it may concern:*

Be it known that I, WILLIAM C. BUCK, subject of the King of Great Britain, residing at Lethbridge, Province of Alberta, Canada, have invented certain new and useful Improvements in Combination Nut-Locks and Washers, of which the following is a specification.

This invention relates to nut locks and comprehends a device wherein a pivoted pawl is employed to engage the nut. In similar devices of this character, considerable trouble has been heretofore experienced through loss of the parts designed to effect the locking of the nut, such parts being small and disconnected.

Accordingly my invention has as one of its objects to provide a nut lock wherein the pawl is pivotally connected to a body member of relatively large size, such member in this instance being a washer, to the end that the pawl cannot become lost, the washer and the pawl being at all times connected.

A further object of this invention is to provide a nut lock wherein the pivoted pawl is preferably constructed of a single piece of metal bent upon itself to form a rigid structure and such as may, by frictional contact, be held in operative position. And a still further object of this invention is generally to improve the construction and increase the efficiency of devices of the above described character.

With these and other objects in view, my invention will be more fully described, illustrated in the accompanying drawing, and then specifically pointed out in the claims which are attached to and form a part of this application.

In the drawing:—Figure 1 is a perspective view of my improved nut lock in operative position upon a bolt; Fig. 2 is a longitudinal sectional view thereof, especially showing the spur which is struck from the washer; Fig. 3 is a perspective view of the washer and pawl, showing the pawl detached.

My improved nut lock is adapted for use in connection with the ordinary form of bolt and nut, the bolt being indicated at 10 in the drawing and which is screw threaded adjacent one extremity to receive the nut 11, the opposite extremity of the bolt being provided with a head 12.

Positioned upon the bolt, is a preferably cylindrical washer 13 which is provided with a central aperture 14, through which the bolt 10 extends. The washer 13 is formed on one side with a preferably rectangular laterally extending enlargement having its sides bent up to form upstanding oppositely disposed flanges 15 which are each provided with apertures 16, the purpose of which will presently appear, the apertures formed in one flange being oppositely disposed with respect to the apertures formed in the other flange. Struck from the laterally extending enlargement 17 is an inwardly turned spur 18 adapted to engage the work 19 to prevent rotary movement of the washer 13 upon the bolt 10.

Pivotally mounted between the flanges 15 is a pawl 20. The pawl 20 is preferably formed from a single piece of metal in which transversely extending incisions are made in the side edges thereof and adjacent one end. The body portion 21 of the pawl is then bent adjacent its longitudinal edges to form upstanding flanges 22. The extremity of the body portion 21 is then bent upwardly transversely to form a head 23 which bears by its inner face adjacent the end faces of the flanges 22.

Pairs of oppositely disposed apertures 24 are formed in the flanges 22 adjacent the ends thereof, said apertures in the operative position of the pawl upon the washer coinciding with the apertures 16 formed in the side flanges 15 thereof. A pivot pin 25 is passed through the outer pair of apertures formed in the flanges and through apertures formed in the flanges 22, thus pivotally connecting the pawl to the washer 13.

It will be noted that the pawl 20 is designed to fit snugly between the flanges 15 formed on the washer 13, the outer faces of the flanges 22 of the pawl frictionally engaging against the inner faces of the flanges. Furthermore, in such position, the free extremity of the body portion 21 of the pawl 20 is designed to seat against the inner face of the enlargement 17 formed on the washer 13.

In the practical use of my improved nut lock and washer, the washer is placed upon the nut with the spur 18 engaging the work. The pawl 20 is then swung upwardly upon the pivot pin 25 when the nut 11 may be applied to the bolt. This done, the pawl 20 is swung downwardly, the head 23 thereof engaging against the side face of the nut, thus preventing its rotary movement.

As shown in Fig. 1 of the drawing, a locking key 26, which may be formed of wire or other suitable material, is designed to be inserted through the coinciding apertures formed at the inner extremities of the flanges 15 and 22, to hold the pawl 20 in operative position. However, if for any reason the locking key 26 becomes broken, the frictional engagement of the flanges 22 against the flanges 15 will serve to hold the pawl 20 in operative position.

Particular attention is directed to the peculiar construction of pawl which I provide, the longitudinally extending flanges 22 thereof serving to brace the head 23. This is an important feature of my invention since the head 23 is thereby made practically rigid. It will therefore be seen that I provide a very simple and effective structure for the purpose set forth, such as may be applied to bolts and nuts as now manufactured and which is, furthermore, very simple in operation.

Having thus described the invention, what is claimed as new is:

1. A nut lock including a plate having an opening for the passage of a bolt, means for preventing the independent rotary movement of the plate when in operative position, upstanding flanges formed on the plate, a pawl pivotally connected to the plate, said pawl being formed with longitudinally extending flanges and a transversely extending head bearing against one end face of each flange, said head being adapted to engage a nut, the flanges formed on the pawl being adapted to be received between and frictionally engage against the side faces of the flanges formed on the plate, and means for locking the pawl in operative position.

2. A nut lock including a plate having an opening for the passage of a bolt, means for preventing the independent rotary movement of the plate when in operative position, said plate being formed with flanges, a pawl pivotally connected to the plate and having flanges formed thereon, an upstanding head formed on the pawl and adapted to engage a nut, the flanges of the plate and the flanges of the pawl having apertures formed therein, and means disposed within said apertures for locking the pawl in operative position.

3. A nut lock including a plate having an opening for the passage of a bolt, means for preventing the independent rotary movement of the plate when in operative position, a pawl pivotally connected to the plate, said pawl being formed from a suitable metallic blank having transversely extending incisions formed therein, the sides of the blank being bent upwardly to provide flanges and one extremity of the blank being bent upwardly in alinement with said incisions to form a head disposed to contact with the adjacent extremities of said flanges, said head being adapted to engage a nut, and means for locking the pawl in operative position.

4. A nut lock including a plate having an opening for the passage of a bolt, means for preventing the independent rotary movement of the plate when in operative position, a pawl mounted upon the plate and provided with an upstanding head adapted to engage a nut, and means formed on said pawl and engaging said head, said means forming an abutment for the head.

5. A nut lock including a plate having an opening for the passage of a bolt, means for preventing the independent rotary movement of the plate when in operative position, a pawl mounted upon said plate and having an upstanding head formed thereon adapted to engage a nut, and a flange formed on the pawl and engaging said head, said flange forming an abutment for the head.

In testimony whereof I affix my signature in presence of two witnesses.

WILLIAM C. BUCK. [L. S.]

Witnesses:
 AMY R. WATERMAN,
 FRANCIS G. HOLYOAK.